US010625329B2

(12) United States Patent
Avetsisiants

(10) Patent No.: US 10,625,329 B2
(45) Date of Patent: Apr. 21, 2020

(54) RAILING SYSTEM

(71) Applicant: Raman Avetsisiants, Cape May Court House, NJ (US)

(72) Inventor: Raman Avetsisiants, Cape May Court House, NJ (US)

( * ) Notice: Subject to any disclaimer, the term of this patent is extended or adjusted under 35 U.S.C. 154(b) by 401 days.

(21) Appl. No.: 15/629,241

(22) Filed: Jun. 21, 2017

(65) Prior Publication Data

US 2018/0369894 A1   Dec. 27, 2018

(51) Int. Cl.
| | | |
|---|---|---|
| *B21D 39/04* | (2006.01) | |
| *E04F 11/18* | (2006.01) | |
| *E04H 17/14* | (2006.01) | |
| *F16B 7/04* | (2006.01) | |
| *F16B 5/12* | (2006.01) | |
| *B21D 39/00* | (2006.01) | |
| *F16B 17/00* | (2006.01) | |

(52) U.S. Cl.
CPC ........ *B21D 39/044* (2013.01); *E04F 11/1817* (2013.01); *E04F 11/1836* (2013.01); *E04F 11/1842* (2013.01); *E04H 17/14* (2013.01); *F16B 5/126* (2013.01); *F16B 7/0453* (2013.01); *B21D 39/00* (2013.01); *E04F 2011/1821* (2013.01); *F16B 17/00* (2013.01)

(58) Field of Classification Search
CPC ............... E04F 11/181; E04F 11/1817; E04F 2011/1819; E04F 2011/1821; E04F 2011/1827; E04H 17/1421; E04H 17/1434; E04H 17/1443; E04H 2017/1447; E04H 2017/1452
See application file for complete search history.

(56) References Cited

U.S. PATENT DOCUMENTS

| | | | | | |
|---|---|---|---|---|---|
| 3,858,850 | A | * | 1/1975 | Maxcy | E04F 11/1834 256/22 |
| 4,346,872 | A | * | 8/1982 | Tornya | E04F 11/181 256/65.02 |
| 4,586,697 | A | * | 5/1986 | Tornya | E04F 11/181 256/22 |
| 4,750,713 | A | * | 6/1988 | Hirose | E04F 11/181 256/55 |
| 4,805,879 | A | * | 2/1989 | Spera | E04F 11/1853 256/65.12 |
| 5,713,171 | A | * | 2/1998 | Andres | E04H 17/1443 256/19 |
| 6,061,991 | A | * | 5/2000 | Dahl | E01D 19/103 52/832 |

(Continued)

FOREIGN PATENT DOCUMENTS

| | | | | |
|---|---|---|---|---|
| FR | 2529925 A1 | * | 1/1984 | ............ E04F 11/181 |
| FR | 2810688 A1 | * | 12/2001 | ............ E04F 11/181 |
| FR | 2983895 B1 | * | 8/2014 | ............ E06B 11/02 |

*Primary Examiner* — Michael P Ferguson

(57) ABSTRACT

A rail system. The rail system includes an upper rail member, a lower rail member and a plurality of balusters. The upper rail member, lower rail member and balusters secure together and to a support structure to form the rail system. The support structure may include columns, newels, walls and the like. The upper and lower rail members each include a cap that snaps onto a rail support. Fasteners may fasten the balusters directly to an upper rail support. Fasteners may further fasten the balusters directly to a lower cap.

9 Claims, 5 Drawing Sheets

(56) References Cited

U.S. PATENT DOCUMENTS

| | | | |
|---|---|---|---|
| 6,702,259 B2* | 3/2004 | Pratt | E04F 11/181 256/65.03 |
| 6,874,766 B2* | 4/2005 | Curatolo | E04F 11/1817 256/59 |
| 7,472,482 B2* | 1/2009 | Pratt | E04F 11/181 29/897.35 |
| 7,543,802 B2* | 6/2009 | Petta | E04F 11/1812 256/59 |
| 7,731,160 B2 | 6/2010 | Terrels et al. | |
| 7,744,065 B2* | 6/2010 | Terrels | H02G 3/0456 256/59 |
| 7,913,960 B1* | 3/2011 | Herr, III | E04F 11/181 16/221 |
| 8,167,275 B1* | 5/2012 | Bizzarri | E04F 11/181 256/65.08 |
| 8,353,500 B2* | 1/2013 | Walpole | E04H 17/1421 256/65.03 |
| 8,695,948 B2* | 4/2014 | Stinson | E04F 11/1836 256/64 |
| 8,713,853 B2* | 5/2014 | Toro | E06B 9/04 49/381 |
| 9,611,650 B1* | 4/2017 | Bizzarri | E04F 11/181 |
| 9,822,547 B2* | 11/2017 | Bizzarri | E04F 11/181 |
| 10,309,091 B2* | 6/2019 | McNamee | E04B 1/003 |
| 10,358,841 B2* | 7/2019 | Bizzarri | E04H 17/20 |
| 2003/0098453 A1* | 5/2003 | Pratt | E04F 11/181 256/24 |
| 2004/0051092 A1* | 3/2004 | Curatolo | E04F 11/1817 256/19 |
| 2004/0188666 A1* | 9/2004 | Pratt | E04F 11/181 256/65.07 |
| 2005/0133777 A1* | 6/2005 | Forbis | E04F 11/1836 256/59 |
| 2005/0191466 A1 | 9/2005 | Andrade | |
| 2006/0196053 A1* | 9/2006 | Pratt | E04F 11/181 29/897.35 |
| 2008/0265232 A1* | 10/2008 | Terrels | H02G 3/0456 256/65.04 |
| 2009/0134377 A1* | 5/2009 | Petta | E04F 11/181 256/65.01 |
| 2009/0224222 A1* | 9/2009 | Dezen | E04F 11/1817 256/59 |
| 2010/0025648 A1* | 2/2010 | Walpole | E04H 17/1421 256/24 |
| 2011/0198552 A1 | 8/2011 | Umosella, III | |
| 2011/0233498 A1* | 9/2011 | Stinson | E04F 11/1817 256/65.01 |
| 2015/0115214 A1* | 4/2015 | Schneider | E04F 11/1834 256/67 |
| 2015/0247340 A1* | 9/2015 | Bizzarri | E04F 11/181 256/65.08 |
| 2015/0247341 A1* | 9/2015 | Bizzarri | E04F 11/181 256/65.02 |
| 2017/0336064 A1* | 11/2017 | Simon | F21V 21/025 |
| 2018/0119407 A1* | 5/2018 | McNamee | E04B 1/003 |

* cited by examiner

RAILING SYSTEM

BACKGROUND OF THE INVENTION

The present invention relates to a railing system and, more particularly, to an improved railing system that is strong and aesthetically pleasing.

Railing systems for stairways, decks, porches, and other structures which employ guardrail type assistance and protection, usually consist of a number of vertical support newels or columns, inter-connected by handrails, from which balusters extend. These components are commonly connected to each other with nails, screws, rivets, or nuts and bolts. Unfortunately, such fasteners provide only a relatively small contact surface area between the components. This results in a less than secure and permanent connection, one which will often work loose and cause instability in sections of the railing system. Even after attachment, such fasteners remain exposed and extend out from the railing components. This poses a safety risk to those who use the railing system or pass by it. Aesthetically, exposed fasteners are unsightly and severely detract from the appearance of the overall railing system.

As can be seen, there is a need for an improved railing system that is strong and aesthetically pleasing.

SUMMARY OF THE INVENTION

In one aspect of the present invention, a railing system comprises: an upper rail support and a lower rail support each comprising a base, a pair of sidewalls extending upwards from the base, a plurality of channels extending along a length of an inner surface of the rail support and having open ends, and a pair of slots formed along the length of an outer surface of the rail support; a plurality of brackets each comprising a first set of fastener openings aligned with the open ends of the plurality of channels, wherein fasteners run through the aligned openings and open ends connecting the brackets to ends of the upper rail support and the lower rail support, and a second set of openings for receiving fasteners through the bracket and into a support structure; and an upper cap and a lower cap each comprising a top wall and a pair of sides extending downwards from the top wall, wherein a pair of tabs extend from an inner surface of the cap, wherein the pair of tabs of the upper cap and the lower cap snap into the pair of slots of the upper rail support and the lower rail support respectively, thereby connecting the upper cap to the upper rail support and the lower cap to the lower rail support.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
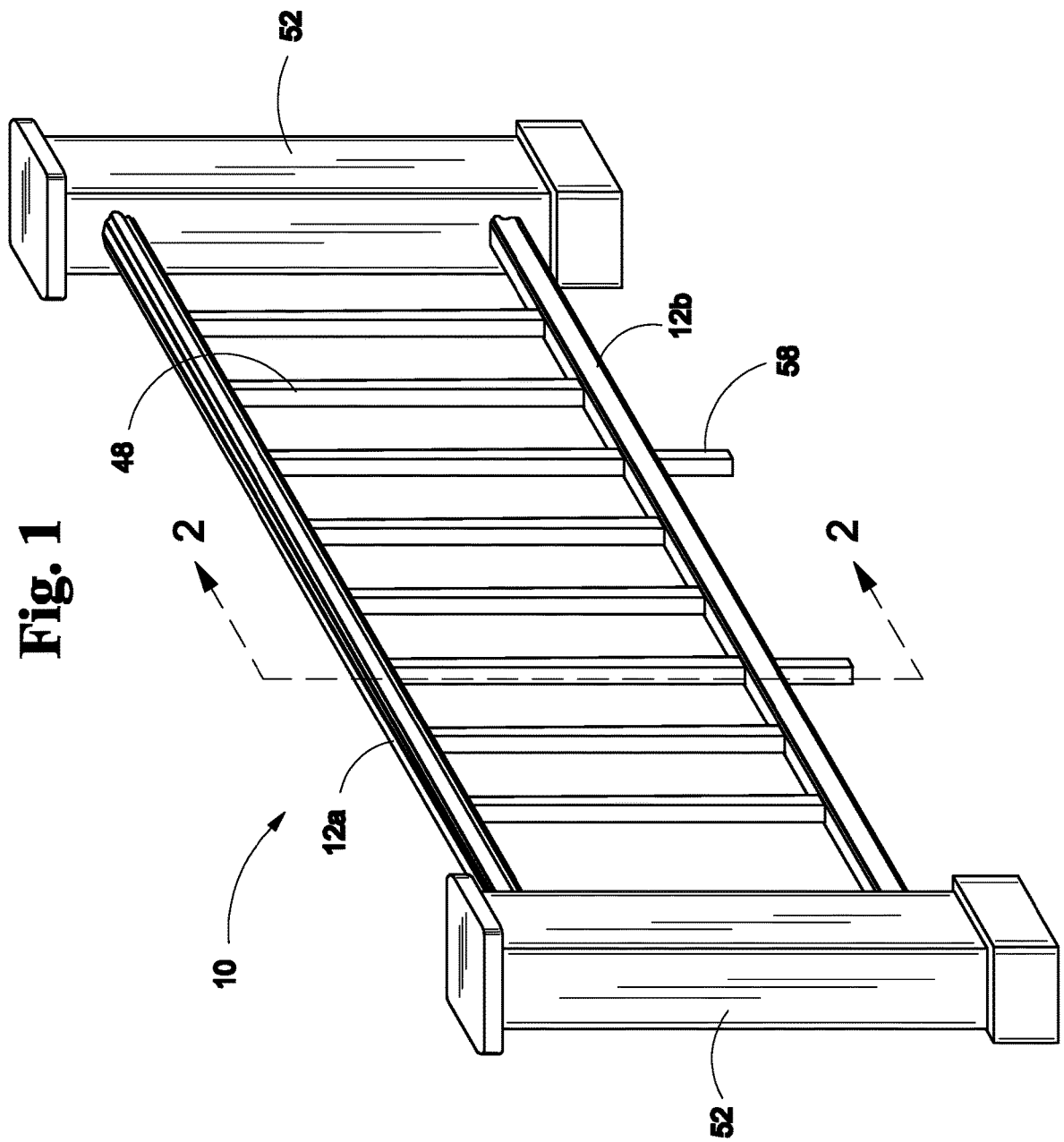
FIG. 1 is a perspective view of an embodiment of the present invention.
Figure 2:
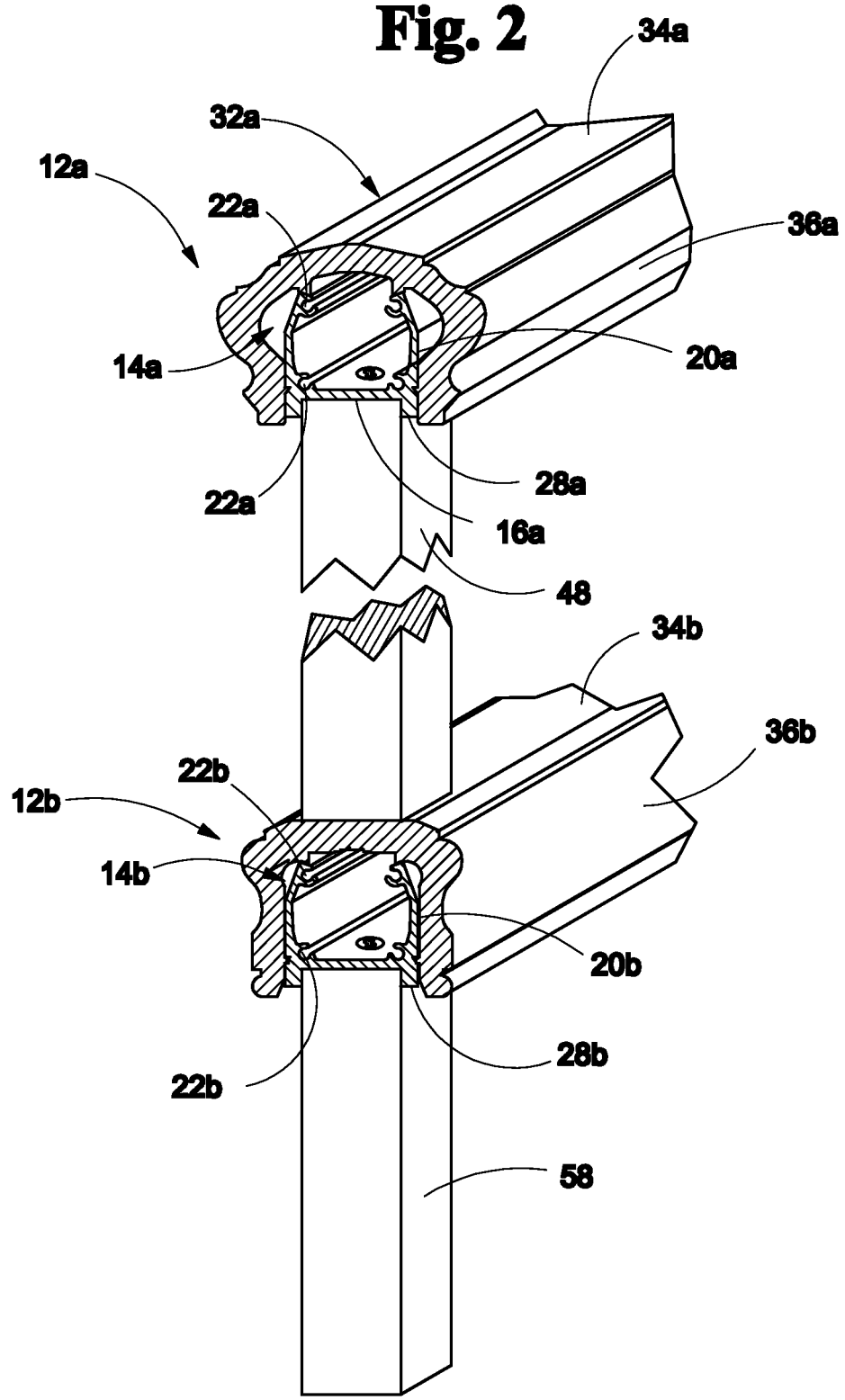
FIG. 2 is a section view of the present invention taken along line 2-2 of FIG. 1.
Figure 3:
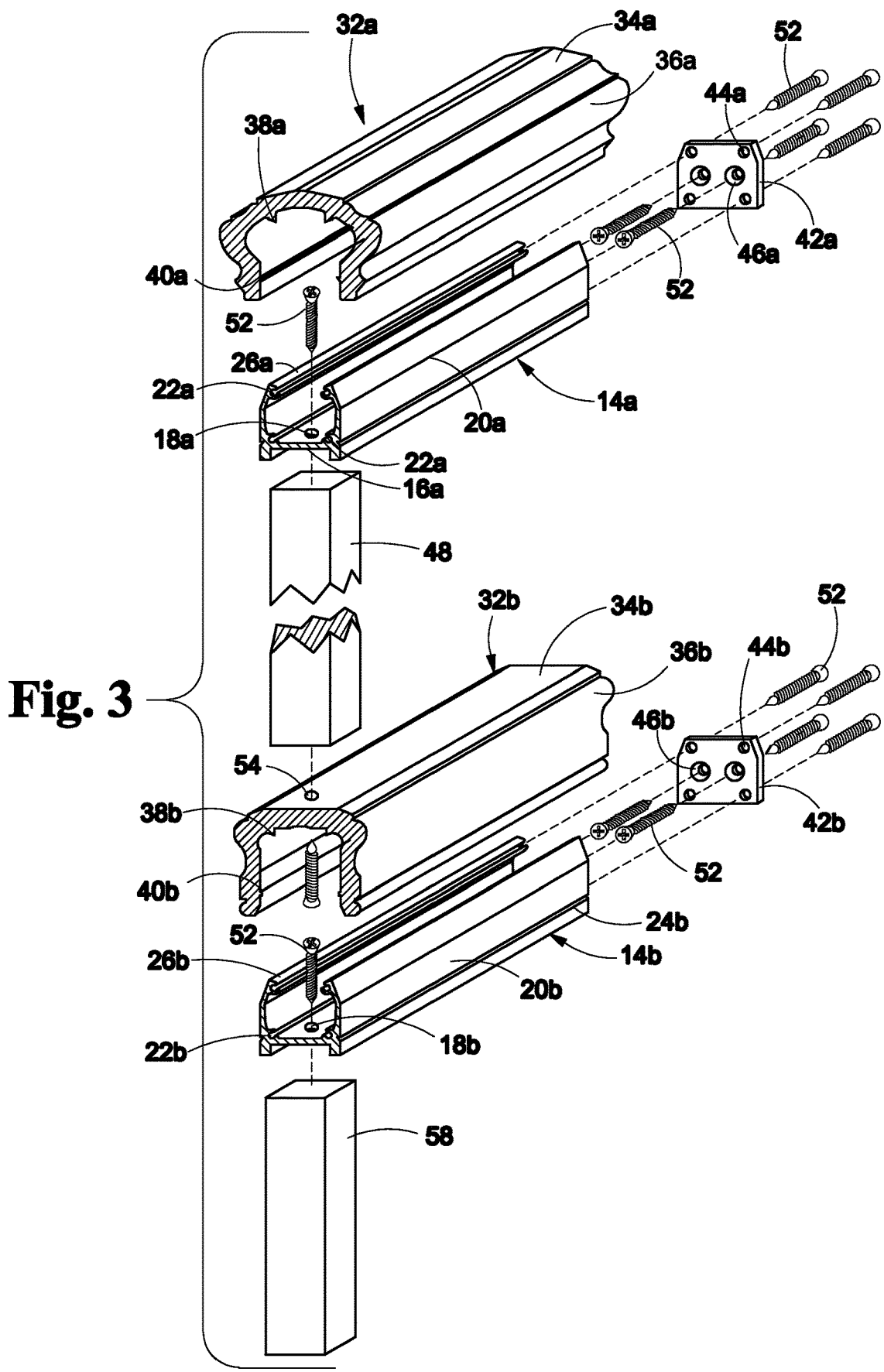
FIG. 3 is exploded view of an embodiment of the present invention.
Figure 4:
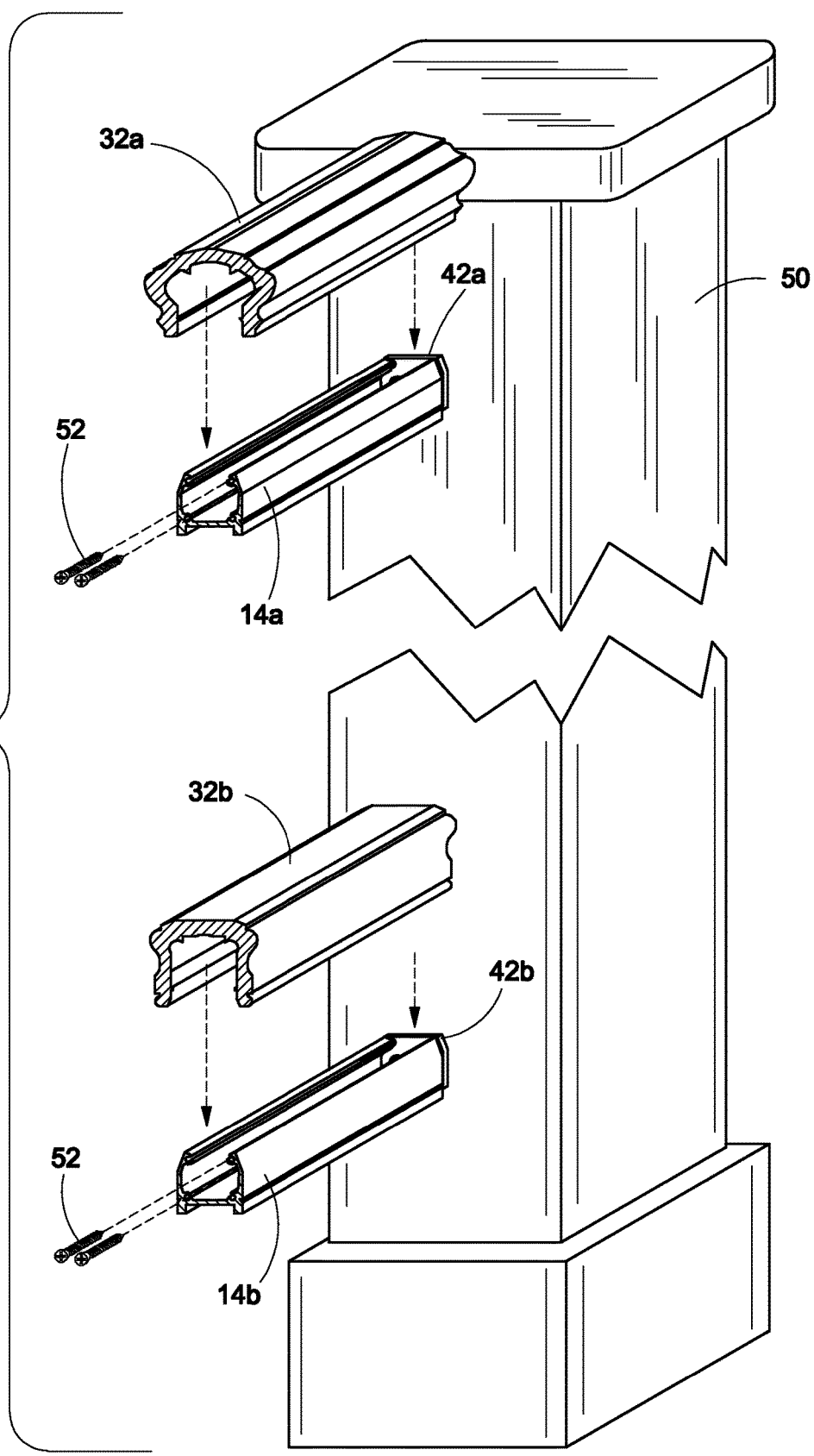
FIG. 4 is exploded view of an embodiment of the present invention.
Figure 5:
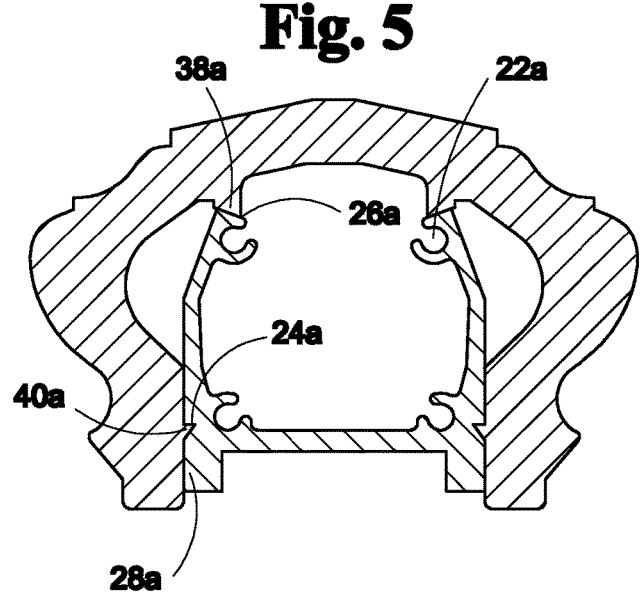
FIG. 5 is a section view of an upper member of an embodiment of the present invention.
Figure 7:
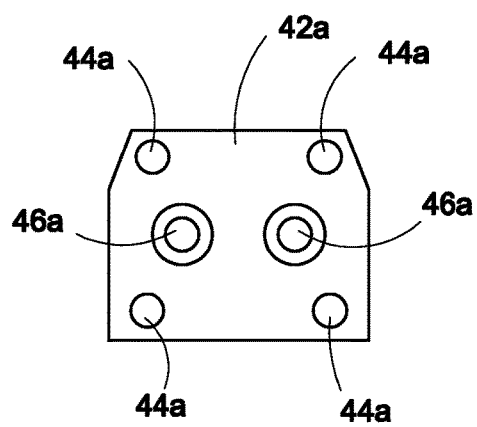
FIG. 7 is a front view of a bracket of an embodiment of the present invention.
Figure 6:
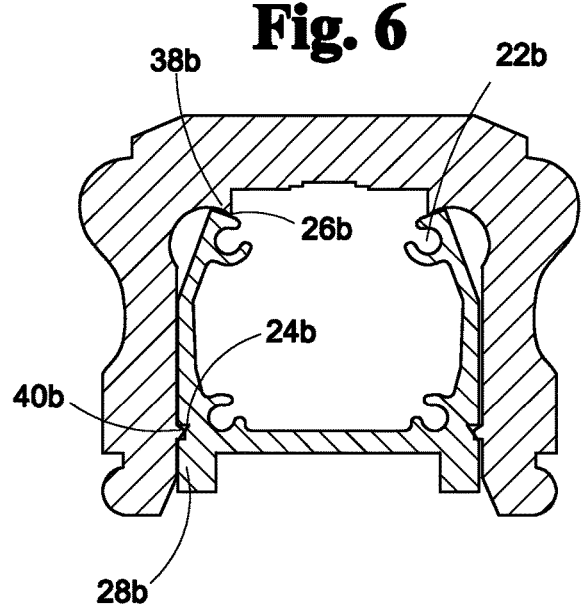
FIG. 6 is a section view of a lower member of an embodiment of the present invention.

Referring to FIGS. 1 through 7, the present invention includes a rail system 10. The rail system 10 includes an upper rail member 12a, a lower rail member 12b and a plurality of balusters 48. The upper rail member 12a, lower rail member 12b and balusters 48 secure together and to a support structure 50 to form the rail system 10. The support structure 50 may include columns, newels, walls and the like. The upper and lower rail members 12a, 12b each include a cap 32a, 32b that snaps onto a rail support 14a, 14b. Fasteners 52 may fasten the balusters 48 directly to an upper rail support 14a. Fasteners 52 may further fasten the balusters 48 directly to a lower cap 32b.

The upper rail member 12a includes the upper rail support 14a. The upper rail support 14a is an elongated, lightweight, extruded member that may be made of aluminum or other lightweight and strong materials. The upper rail support 14a includes a base 16a having a plurality of fastener openings 18a formed therethrough. A pair of sidewalls 20a extend upwards from either side of the base 16a. A plurality of open ended channels 22a are formed along the length of the inner surface of the upper rail support 14a. For example, a pair of first channels 22a are formed at the bottom of the sidewalls 20a where the base 16a and the sidewalls 20a intersect and a pair of second channels 22a are formed along the top of the sidewalls 20a. The upper rail support 14a may further include a pair of slots 24a formed on the outer surface. For example, the pair of slots 24a are formed along the bottom of the sidewalls 20a on the outer surface and also extend along the length of the upper rail support 14a. A pair of angled flanges 26a may be formed along a length of the top ends of the sidewalls 20a. The pair of angled flanges 26a may be angled inwards towards one another. A pair of guide extensions 28a extend downwards from the base 16a. In such embodiments, the upper rail support 14a forms an H-shape.

The upper rail member 12a further includes an upper cap 32a. The upper cap 32a includes top wall 34a. The top wall 34a may include a rounded or flat upper surface. Upper tabs 38a are formed along the length of the top wall 34a and extend downward from a lower surface of the top wall 34a. A pair of sides 36a extends downwards from opposing sides of the top wall 34a. The pair of sides 36a may be angled towards one another. Lower tabs 40a are formed along a length of the inner surface of the pair of sides 36a. The lower tabs 40a extend inward from the pair of sides 36a.

The upper rail member 12a further includes upper brackets 42a. The upper brackets 42a are secured to the ends of the upper rail support 14a. The upper brackets 42a are plates that have a first set of apertures 44a and a second set of apertures 46a formed therethrough. The first set of apertures 44a align with the pair of first channels 22a and the pair of second channels 22a. The second set of apertures 46a receive fasteners 52 that are driven into the support structures 50. In certain embodiments, the first set of apertures 44a are countersunk on a first side of the upper brackets 42a and the second set of apertures 46a are countersunk on a second side of the upper brackets 42a.

The lower rail member 12b includes a lower rail support 14b. The lower rail support 14b may be the same as the upper rail support 14a. The lower rail support includes a base 16b having a plurality of fastener openings 18b formed therethrough. A pair of sidewalls 20b extend upwards from either side of the base 16b. A plurality of open ended channels 22b are formed along the length of the inner surface of the lower rail support 14b. For example, a pair of first channels 22b are formed at the bottom of the sidewalls 20b where the base 16b and the sidewalls 20b intersect and a pair of second channels 22b are formed along the top of the sidewalls 20b. The lower rail support 14b may further include a pair of slots 24b formed on the outer surface. For example, the pair of slots 24b are formed along the bottom of the sidewalls 20b on the outer surface and also extend along the length of the lower rail support 14b. A pair of angled flanges 26b may be formed along a length of the top ends of the sidewalls 20b. The pair of angled flanges 26b may be angled inwards towards one another. A pair of guide extensions 28b extend downwards from the base 16b. In such embodiments, the lower rail support 14b forms an H-shape.

The lower rail member 12b further includes the lower cap 32b. The lower cap 32b includes top wall 34b. The top wall 34b may include a flat upper surface to properly support the bottoms of the balusters 48. The top wall 34b further includes fastener openings 54. Upper tabs 38b are formed along the length of the top wall 34b and extend downward from a lower surface of the top wall 34b. A pair of sides 36b extends downwards from opposing sides of the top wall 34b. Lower tabs 40b are formed along a length of the inner surface of the pair of sides 36b. The lower tabs 40b extend inward from the pair of sides 36b.

The lower rail member 12b further includes lower brackets 42b. The upper brackets 42a and the lower brackets 42b may be the same. The lower brackets 42b are secured to the ends of the lower rail support 14b. The lower brackets 42b are plates that have a first set of apertures 44b and a second set of apertures 46a formed therethrough. The first set of apertures 44b align with the pair of first channels 22b and the pair of second channels 22b. The second set of apertures 46a receive fasteners 52 that are driven into the support structures 50. In certain embodiments, the first set of apertures 44b are countersunk on a first side of the lower brackets 42b and the second set of apertures 46a are countersunk on a second side of the lower brackets 42b.

Assembling the rail system 10 may include the following. Place the top ends of the balusters 48 in between the guide extensions 28a of the upper rail support 14a. Drive fasteners 52 through the fastener openings 18a of the base 16a of the upper rail support 14a and into the top ends of the balusters 48. Drive fasteners 52 through the fastener openings 54 of the top wall 34b of the lower cap 32b and into the bottom ends of the balusters 48. Snap the lower cap 32b onto the lower rail support 14b so that the pair of lower tabs 40b of the lower cap 32b snap into the pair of slots 24b of the lower rail support 14b and the pair of upper tabs 38b of the lower cap 32b snap onto the pair of angled flanges 26b of the lower rail support 14b. Drive fasteners 52 through the first set of apertures 44a, 44b of each the brackets 42a, 42b and into the open ends of the first and second pair of channels 22b, 22b of each of the ends of the upper and lower rail supports 14a, 14b. Drive fasteners 52 through the second set of apertures 46a, 46b of each of the brackets 42a, 42b and into the support structures 50. Snap the upper cap 32a onto the upper rail support 14a so that the pair of lower tabs 40a of the upper cap 32a snap into the pair of slots 24a of the upper rail support 14a and the pair of upper tabs 38a of the upper cap 32a snap onto the pair of angled flanges 26a of the upper rail support 14a.

In certain embodiments, the railing system 10 utilizes lower support ballasts 58. In such embodiments, fasteners 52 are driven through the fastener openings 18b of the base 16b of the lower rail support 14b and into the top ends of the lower support ballasts 58 prior to snapping the lower cap 32b onto the lower rail support 14b.

It should be understood, of course, that the foregoing relates to exemplary embodiments of the invention and that modifications may be made without departing from the spirit and scope of the invention as set forth in the following claims.

What is claimed is:

1. A railing system comprising:
    an upper rail support and a lower rail support, each rail support comprising:
    a base,
    a pair of sidewalls extending upwards from the base, the plurality of sidewalls spaced apart and a gap defined between top ends of the pair of sidewalls,
    a plurality of channels extending along a length of an inner surface of the rail support and having open ends, wherein the plurality of channels comprises at least a first pair of channels disposed adjacent the top ends of the sidewalls,
    a pair of slots formed along the length of an outer surface of the pair of sidewalls of the rail support, and
    a pair of angled flanges formed on the top ends of the pair of sidewalls adjacent the first pair of channels, wherein the pair of angled flanges are defined on an inner surface of the top ends and comprise inward-facing abutment surfaces angled towards one another so that the pair of angled flanges are facing one another;
    a plurality of brackets, each bracket comprising:
    a first set of fastener openings aligned with the open ends of the plurality of channels, wherein fasteners run through the aligned openings and open ends connecting the brackets to ends of the upper rail support and the lower rail support, and
    a second set of fastener openings disposed above the base and below the top ends of the pair of sidewalls, the second set of openings for receiving fasteners through the bracket and into a support structure; and
    an upper cap and a lower cap, each cap comprising a top wall and a pair of sides extending downwards from the top wall, wherein a pair of side tabs extend from an inner surface of the pair of sides of the cap and a pair of upper tabs extend downward from the top wall, wherein the pair of upper tabs comprise outward-facing abutment surfaces facing away from one another,
    wherein the pair of side tabs of the upper cap and the lower cap snap into the pair of slots of the upper rail support and the lower rail support respectively, and the pair of upper tabs of the upper cap and the lower cap snap onto the pair of angled flanges of the upper rail support and the lower rail support respectively, such that the outward-facing abutment surfaces of the upper tabs engage with the inward-facing abutment surfaces of the angled flanges, thereby connecting the upper cap to the upper rail support and the lower cap to the lower rail support.

2. The railing system of claim 1, wherein the base of the upper rail support has a plurality of fastener openings formed therethrough, wherein fasteners run through the fastener openings and into a plurality of balusters.

3. The railing system of claim 2, wherein the upper rail support further comprises a pair of guide extensions extending downwards from the base, wherein the balusters fit in between the pair of guide extensions.

4. The railing system of claim 3, wherein the pair of guide extensions each comprise a flange protruding towards one another, wherein the balusters fit in between the flanges.

5. The railing system of claim 1, wherein the upper rail support and lower rail support each comprises an H-shaped cross-section.

6. The railing system of claim 1, wherein the base of the lower rail support has a plurality of fastener openings formed therethrough, wherein fasteners run through the fastener openings and into a plurality of lower support balusters.

7. The railing system of claim 1, wherein the top wall of the lower cap has a plurality of fastener openings formed therethrough, wherein fasteners run through the fastener openings and into a plurality of balusters.

8. The railing system of claim 1, wherein the plurality of channels comprises a second pair of channels disposed at the intersection of the base and the sidewalls and the first pair of channels disposed at the tog ends of the sidewalls.

9. The railing system of claim 1, wherein the first set of fastener openings are countersunk on a first side of each of the plurality brackets and the second set of fastener openings are countersunk on a second side of each of the plurality of brackets.

\* \* \* \* \*